United States Patent
Ebert et al.

(10) Patent No.: US 11,867,831 B2
(45) Date of Patent: Jan. 9, 2024

(54) GENERATION OF SYNTHETIC RADAR SIGNALS

(71) Applicant: Robert Bosch GmbH, Stuttgart (DE)

(72) Inventors: Jasmin Ebert, Heidelberg (DE); Michael Pfeiffer, Schoenaich (DE)

(73) Assignee: ROBERT BOSCH GMBH, Stuttgart (DE)

( * ) Notice: Subject to any disclaimer, the term of this patent is extended or adjusted under 35 U.S.C. 154(b) by 737 days.

(21) Appl. No.: 16/980,820

(22) PCT Filed: Mar. 18, 2019

(86) PCT No.: PCT/EP2019/056712
§ 371 (c)(1),
(2) Date: Sep. 14, 2020

(87) PCT Pub. No.: WO2019/179946
PCT Pub. Date: Sep. 26, 2019

(65) Prior Publication Data
US 2021/0088628 A1 Mar. 25, 2021

(30) Foreign Application Priority Data
Mar. 23, 2018 (DE) .......................... 102018204494.5

(51) Int. Cl.
*G01S 7/40* (2006.01)
*G01S 7/41* (2006.01)
(Continued)

(52) U.S. Cl.
CPC ............ *G01S 7/4052* (2013.01); *G01S 7/412* (2013.01); *G06F 7/58* (2013.01); *G06N 3/04* (2013.01); *G06N 3/08* (2013.01); *G01S 7/406* (2021.05)

(58) Field of Classification Search
CPC ........ G01S 7/4052; G01S 7/406; G01S 7/412; G06F 7/58; G06N 3/04; G06N 3/08; G09B 9/54
See application file for complete search history.

(56) References Cited

U.S. PATENT DOCUMENTS

| | | | |
|---|---|---|---|
| 8,682,821 B2 | 3/2014 | Benitez et al. | |
| 2007/0005257 A1 | 1/2007 | Cheng et al. | |

FOREIGN PATENT DOCUMENTS

| | | |
|---|---|---|
| CN | 1482453 A | 3/2004 |
| CN | 106504190 A | 3/2017 |

(Continued)

OTHER PUBLICATIONS

International Search Report for PCT/EP2019/056712, dated Jul. 23, 2019.

(Continued)

*Primary Examiner* — Timothy X Pham
(74) *Attorney, Agent, or Firm* — NORTON ROSE FULBRIGHT US LLP; Gerard A. Messina (57) ABSTRACT

A generator for generating two- or multi-dimensional frequency representations of synthetic radar signals from a set of radar signals measured by a physical radar sensor. The generator includes a random number generator and a first AI module, which, as input, receives vectors or tensors of random values from the random number generator and uses an internal processing chain to map each such vector, respectively each such tensor, onto a two- or multi-dimensional frequency representation of a synthetic radar signal. The internal processing chain of the first AI module is parameterized by a multiplicity of parameters which are set in such a way that the two- or multi-dimensional frequency representation of the radar signal and/or at least one char- (Continued)

acteristic derived therefrom have the same distribution for the synthetic radar signals as for the measured radar signals.

13 Claims, 4 Drawing Sheets

(51) Int. Cl.
*G06F 7/58* (2006.01)
*G06N 3/04* (2023.01)
*G06N 3/08* (2023.01)

(56) References Cited

FOREIGN PATENT DOCUMENTS

| DE | 112016000274 T5 | 10/2017 |
|---|---|---|
| DE | 102017116192 A1 | 1/2018 |
| KR | 20130099304 A | 9/2013 |

OTHER PUBLICATIONS

Lars Reichardt et al., "Virtual Drive: A Complete V2X Communication and Radar System Simulator for Optimization of Multiple Antenna Systems," Proceedings of the IEEE, IEEE, vol. 99, No. 7, 2011, pp. 1295-1310. XP011367582.

GENERATION OF SYNTHETIC RADAR SIGNALS

FIELD

The present invention relates to generating synthetic radar signals, which can be used, in particular as training data for detecting objects in radar signals by machine learning.

BACKGROUND INFORMATION

For a vehicle to be able to move in an at least partially automated manner in road traffic, it is necessary that the driving environment of the vehicle be sensed and that countermeasures be initiated in the case of an imminent collision with an object in the driving environment of the vehicle. Safe automated driving also requires generating a driving environment representation and localization.

When objects are sensed by radar, it is independent of the light conditions. At night, for example, it is even possible at a great distance without the oncoming traffic being dazzled by high beams. Furthermore, the distance and velocity of objects are derived directly from the radar data. This information is important for the assessment of whether a collision with the objects can occur. However, the type of object concerned is not directly detectable from the radar signals. This detection is currently achieved by computing attributes from the digital signal processing.

U.S. Pat. No. 8,682,821 B2 describes using machine learning to classify radar signals as originating from the movement of certain objects or nonhuman animals. This realization can be used to avoid false alarms when an area is monitored for human intruders or also to select the correct collision avoidance action during at least partially automated driving.

SUMMARY

In accordance with an example embodiment of the present invention, a generator is provided for generating two- or multi-dimensional frequency representations of synthetic radar signals from a set of radar signals measured by a physical radar sensor. This generator includes a random number generator and a first AI module, which, as input, receives vectors or tensors of random values from the random number generator and uses an internal processing chain to map each such vector, respectively each such tensor, onto a two- or multi-dimensional frequency representation of a synthetic radar signal.

The two- or multi-dimensional frequency representation may include a representation in a time-frequency domain and/or a representation in a spatial frequency domain. The frequency representation may be obtained, for example, by fast Fourier transformation (FFT), which uses complex exponential functions as base functions. However, transformations may also be used with other base functions, for instance, the wavelet transformation with base functions, each of which is explained only locally.

The internal processing chain of the first AI module is parameterized by a multiplicity of parameters. These parameters are set in such a way that the two- or multi-dimensional frequency representation of the radar signal and/or at least one characteristic derived therefrom has essentially the same distribution for the synthetic radar signals as for the measured radar signals.

With respect to the concept "distribution of a frequency representation," it should be noted in this connection that such a distribution is explained in the multi-dimensional domain of all possible frequency representations. If, for example, a two-dimensional frequency representation has a 200×200 pixel format, then this domain has 40,000 dimensions.

Especially when machine learning is used for detecting objects from radar signals, it was realized that the necessary learning data constitute a scarce resource. Learning data for detecting objects from camera images usually include camera learning images that humans have commented on (labeled) as to which objects are included therein at which location. For humans, in particular, visually detecting objects is especially intuitive, so that the demands on support people to comment on camera images are relatively modest. On the other hand, detecting objects from radar signals requires special knowledge. Furthermore, the radar signal, which produces one and the same object, is also dependent on the properties of the antennae and sensors used, for example, on the modulation pattern of the sensor or on where and how the sensor is mounted on the vehicle. The signal may be varied by multipath propagation, for example, by being repeatedly reflected off of different surfaces (for instance, the roadway, a guardrail and/or a wall). Finally, the radar signal is also material-dependent. Some materials reflect radar waves with different material- and shape-dependent backscatter coefficients, while other materials are penetrated by the radar waves, which, in turn, may lead to actually concealed objects suddenly appearing in the radar signal.

Thus, as a result, learning data for detecting objects from radar signals are, on the one hand, more difficult to obtain, and, on the other hand, more learning data are also required for detecting objects from camera images.

The generator is able to alleviate this paucity. By setting the parameters of the first AI module in such a way that a distribution, which is apparent from the physically measured radar signals, is represented in the synthetic radar signals, and, additionally, as each generated radar signal acts realistically in the sense that it is hardly distinguishable from a real radar signal, any number of realistically acting radar signals may be generated, without the need for commenting in this regard on the original physically measured radar signals. Thus, for example, measurements routinely performed by sensor manufacturers and OEMs during test drives employing radar sensors for object detection may be reused as a database.

The characteristic may be any variable derived from the two- or multi-dimensional frequency representation of the radar signal. If this characteristic varies, for example, between the radar signals measured by the physical radar sensor, it puts these radar signals into context on the basis of the resulting distribution. For example, the characteristic may include reflex points to which a distance, an azimuth angle, a velocity, a backscatter coefficient and/or an elevation angle are assigned relative to the physical radar sensor. A consistent distribution of the characteristic may then be formed via those radar signals which relate to the same or at least a similar scenario.

The parameters of the internal processing chain may be learned by the generator itself. For this purpose, the generator merely requires feedback of any type as to what extent the current parameters lead to a distribution of the frequency representation, respectively of the characteristic, which matches the measured radar signals.

In an especially advantageous embodiment of the present invention, the first AI module receives at least one boundary condition as input. The parameters of the internal processing chain are set in such a way that the two- or multi-dimensional frequency representation and/or the characteristic have/has essentially the same distribution for the synthetic radar signals as for those measured radar signals which satisfy the boundary condition.

By using this extension, for example, a comment provided for the measured radar signals may be transferred to the generator. For example, the boundary condition may be that the measured radar signals are assigned to a specific class by virtue of the comment provided. For each class, it is then possible to separately generate any number of synthetic radar signals that supplement the original supply of radar signals, which have been measured and, at the same time, commented on. This makes it possible for a large database to be created for the monitored learning of an object detection on the basis of radar signals.

On the basis of the existing measured radar signals, however, the boundary condition may also be used, for example, to estimate a radar signal for a situation for which there are no measurements. Thus, for example, the original set of measurements may include radar signals that are received from a particular object in response to radar waves which are incident thereon at specific angles. For example, the boundary condition may be that the angle assumes an intermediate value. The generator then, so to speak, interpolates the radar signal resulting for this intermediate value of the angle.

It is also possible, for example, for synthetic radar signals to be selectively generated for what are commonly known as extreme cases, which rarely occur in reality, but are especially important for object detection. These extreme cases may concern situations that are especially dangerous, for example, and, therefore, require a perfect functioning of a driving assistance system, respectively of a system for at least partially automated driving.

In this instance, anchoring the synthetic radar signals in reality does not require a 3D model of the physical scenario; rather, it suffices that the distribution of the characteristic matches the measured radar signals. Likewise, unlike ray tracing simulations, there is no need for detailed knowledge of the radar sensor, the mounting location thereof, materials, shape and backscatter coefficients of the objects to be detected or multipath propagation.

The boundary condition may continue to be utilized to filter the radar signal using the output of another sensor, for instance, the output of a camera, of a LIDAR sensor, of a further radar sensor or of an array of ultrasonic sensors.

In an especially advantageous embodiment of the present invention, the first AI module includes an artificial neural network whose internal processing chain has at least one fully networked layer and/or at least one convolutional layer. It is a key strength of artificial neural networks that they are able to bridge very large differences in the dimensionality between the input and the output. The vector or tensor having the random values may include on the order of 100 elements, for example, while a two-dimensional frequency representation having 256×256 pixels already has a dimensionality which is higher by a factor of 650.

The random number generator is advantageously a physical random number generator which generates the random values from thermal or electronic noise of at least one component and/or from a time sequence of radioactive decays of an unstable isotope. In this manner, artifacts of a pseudo-random number generator are prevented from being superimposed on the synthetic radar signals generated by the generator.

The present invention also relates to a data set composed of a plurality of two- or multi-dimensional frequency representations of synthetic radar signals that were produced by the generator. This data set may be used, for example, directly as training data for the monitored learning of an object detection and, in this respect, is a product which may be sold separately and which is useful to the customer. The more efficiently the generator works, the more difficult it is to distinguish the synthetic radar signals it generates per se from the physically measured radar signals. If, however, a two- or multi-dimensional frequency representation of a radar signal is provided, on the one hand, and a generator, on the other hand, it is then possible to at least determine a probability that the radar signal was generated by this generator.

The present invention also relates to a method for manufacturing the generator. In the example embodiment of the present invention, two- or multi-dimensional frequency representations of the measured radar signals are combined in a pool with two- or multi-dimensional frequency representations of the synthetic radar signals generated by the generator. A classifier classifies the two- or multi-dimensional frequency representations contained in the pool as to whether they belong to measured or synthetic radar signals. The parameters of the processing chain of the AI module in the generator are optimized to a worst possible classification quality of the classifier.

Thus, the classification quality of the classifier serves as feedback for learning the parameters in the internal processing chain of the first AI module in the generator. This feedback may be an error signal of the classifier, for example, or also a confidence measure generated in the classifier, for example. In particular, the classifier and the generator may be alternately trained and thus serve, so to speak, as mutual sparring partners.

For example, the AI module in the generator may first be initialized by standard values or random values for the parameters. If, at this stage, random values from the random number generator are provided at the input of the AI module, in all likelihood, the generated synthetic radar signal will then not have much to do with the measured radar signals. Accordingly, from the pool of two- or multi-dimensional frequency representations, the classifier will be able to distinguish with great confidence the frequency representation associated with the synthetic radar signal from the frequency representations associated with the measured radar signals. The more the parameters in the processing chain of the AI module are optimized, the more difficult this distinction becomes for the classifier. This may be manifested in the fact that the classification is incorrect in a greater number of cases, and/or that there is a decrease in the confidence with which the classification is made.

The classifier may be of any type of design. It may be a question, for example, of a static classifier which classifies the two- or multi-dimensional frequency representations by testing specific features, or also uses statistical methods to classify the same as measured, respectively synthetically generated. If a boundary condition was stipulated for the generator, the same boundary condition is also stipulated for the classifier.

In an especially advantageous embodiment of the present invention, a second AI module is selected as classifier. This second AI module has a further internal processing chain which is parameterized by a multiplicity of parameters. These parameters are optimized to a most effective possible classification quality of the classifier.

The two AI modules may then be trained simultaneously or also alternately, for example. In this manner, a type of competition is triggered between the first AI module and the second AI module. The first AI module continually learns to "falsify" realistic radar signals, while the second AI module also learns to detect the "falsifications." The end result of the competition is that the synthetic radar signals obtained nearly exactly imitate the original, physically measured radar signals and, together with these, may be used as learning data for the monitored learning of an object detection.

The present invention also relates to a method for detecting objects and/or a space, which is free of objects of a specific type, in the driving environment of a vehicle. The vehicle has at least one radar sensor for sensing at least part of the driving environment. Two- or multi-dimensional frequency representations of radar signals sensed by the radar sensor are classified by a third AI module as to which objects are present in the driving environment of the vehicle. The third AI module was or is trained using training data that were at least partially generated by a generator according to the present invention. The training data may, in particular originate partly from physical measurements and partly from the generator.

This makes it possible to utilize the radar technology advantages mentioned at the outset for object detection, without the inevitable consequence of it being considerably more difficult to acquire the learning data for training the object detection than pure optical object detection. A relatively small set of physically measured radar signals may be extended by the generator to the amount needed to establish a reliable object detection.

In response to detection of at least one object and/or of a space, which is free of objects of a specific type, a physical warning device that is perceptible to the driver of the vehicle, a drive system, a steering system, and/or a braking system of the vehicle, are advantageously triggered to avoid a collision between the vehicle and the object and/or to adapt the speed and/or trajectory of the vehicle. These purposes are the main reasons why an object detection is sought at all.

As explained above, specifying a boundary condition to the generator also makes it possible for a given set of measured scenarios to be interpolated or extrapolated from scenarios for which there are no measurements yet. This may be used not only for evaluating radar signals in accordance with the physical measurement, but also for improving the physical measurement as such. In contrast to a camera, which is a purely passive sensor, a radar sensor is an active sensor, i.e., radar waves emitted by the sensor itself serve as a measurement signal. For that reason, installation parameters and operating parameters of the radar sensor significantly influence the extent to which the radar signals obtained are suitable for the ultimate object detection.

Therefore, the present invention also relates to a method for optimizing at least one installation parameter or operating parameter for a radar sensor for detecting objects and/or a space, which is free of objects (72a, 72b) of a specific type, in the driving environment of a vehicle. In this method, at least one two- or multi-dimensional frequency representation of a synthetic radar signal is generated in each instance by a generator in accordance with the present invention for different values of the installation parameter, respectively operating parameter, and/or retrieved from a data set previously generated by such a generator. A measure of quality is used to evaluate the detection of objects in the two- or multi-dimensional frequency representation of the synthetic radar signal. The installation parameter or operating parameter is varied in such a way that the measure of quality assumes an extreme value.

In view of the ultimate goal of a reliable object detection, the inventors have recognized that it is advantageous to not only consider the analysis of acquired radar signals, but also the physical data acquisition itself. Even when such an effective analysis is used, it is no longer possible to evaluate information that is no longer detectable in the acquired physical radar signal. Such a case may occur, for example, when objects, which are particularly high-contrast, cause the measuring range of the sensor to become so insensitive that a low-contrast person disappears in the noise. Thus, when the physical data acquisition and the subsequent analysis are holistically considered and optimized, the ultimately obtained object detection may be improved even further.

It is thereby possible, in particular to use the measure of quality to tailor the object detection to specific objects and, in the event of conflicts of objectives, to set priorities. No set of installation parameters or operating parameters can be perfect for all eventualities. For example, the reliable detection of a pedestrian, a cyclist or of another lower contrast road user may take precedence over detection of a concrete bollard. If, at this stage, improved detection of lower contrast road users is a topmost priority, it may happen that this is only possible at the expense of other aspects, such as at the cost of some concrete bollards not being detected.

Although the generator and the methods each make use of hardware, and the selective use of appropriately optimized hardware is advantageous in each instance, there are also functional embodiments of the generator and of the method which make do with the use of already existing hardware. Thus, since the function is provided in accordance with the present invention, complete or partial implementation in a software, which controls the hardware differently, is possible. This software may be distributed as an update or upgrade to existing hardware, for example, and, in this respect, is a separate product. Thus, the present invention also relates to a computer program having machine-readable instructions, which, when executed on a computer and/or a control unit, upgrade the computer and/or the control unit to a generator according to the present invention, and/or prompt the same to execute a method in accordance with the present invention. The present invention also relates to a machine-readable data carrier and/or to a download product having the computer program.

With reference to the figures, other refinements of the present invention are explained in greater detail in the following, along with the description of preferred exemplary embodiments of the present invention.

DETAILED DESCRIPTION OF EXAMPLE EMBODIMENTS

Figure 1:
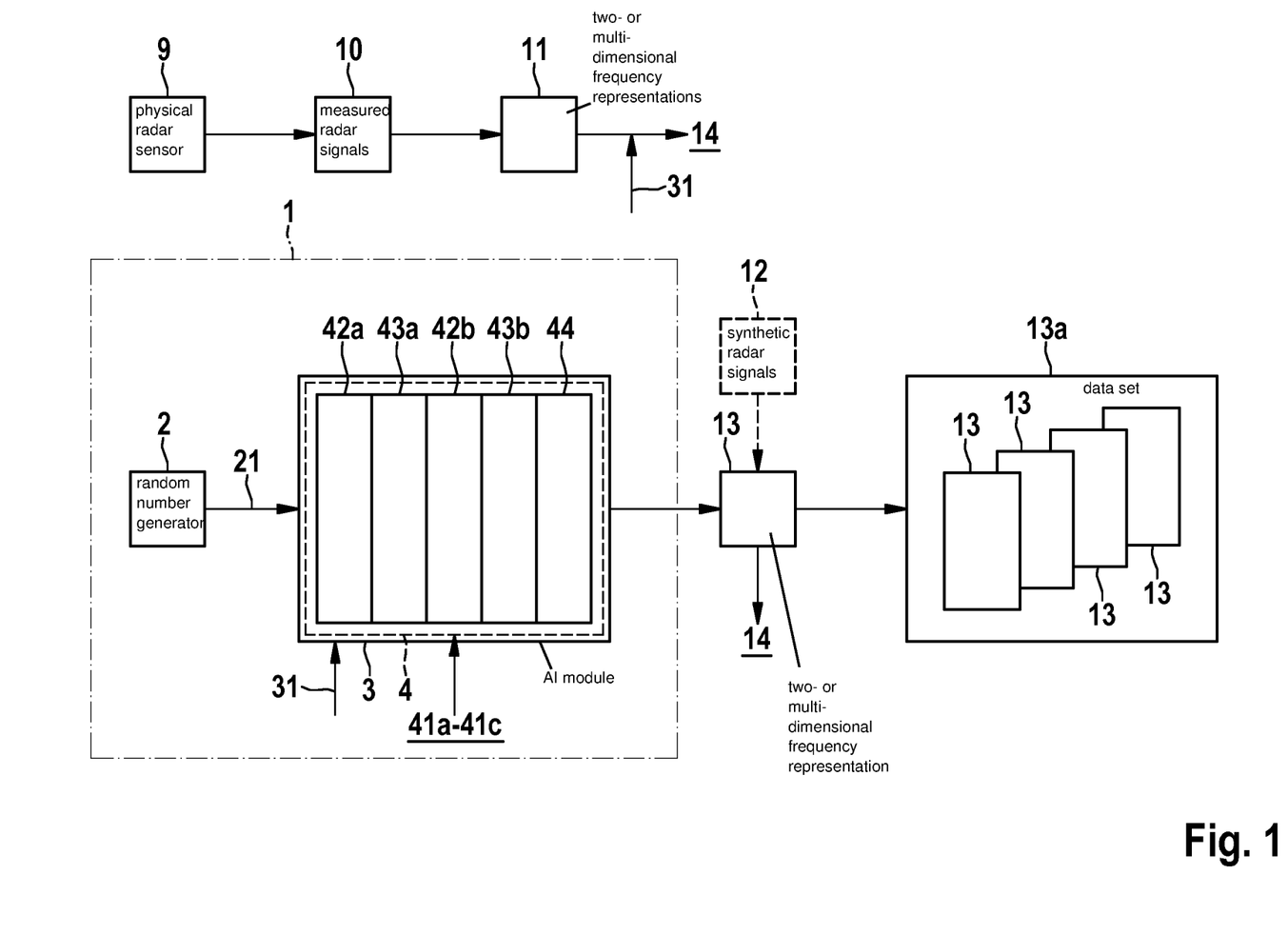
FIG. 1 shows an exemplary embodiment of a generator 1 in accordance with the present invention.

In accordance with FIG. 1, generator 1 includes a random number generator 2 and a AI module 3 having an internal processing chain 4. Random number generator 2 feeds random values 21 as input into AI module 3, which then generates two- or multi-dimensional frequency representations 13, taking into account a likewise input boundary condition 31. These frequency representations 13 correspond to synthetic radar signals 12.

AI module 3 includes a neural network, whose internal processing chain 4 has two convolutional layers 42a and 42b, two fully networked layers 43a and 43b, as well as an upsampling layer 44.

Internal processing chain 4 is parameterized by a multiplicity of parameters 41a-41c. Other architectures are also possible, however, which, for example, include only one convolutional layer 42a, 42b and no fully networked layer 43a, 43b, or only one fully networked layer 43a, 43b and no convolutional layer 42a, 42b, and in which an upsampling layer 44 is missing.

A characteristic 14 may be derived from two- or multi-dimensional frequency representation 13 generated by generator 1. An analog characteristic 14 is also derivable from two- or multi-dimensional frequency representations 11 of radar signals 10 measured by a physical radar sensor 9; here, too, those frequency representations 11 being selected which match predefined boundary condition 31.

Parameters 41a-41c of internal processing chain 4 in AI module 3 of generator 1 are set in such a way that two- or multi-dimensional frequency representation 11, 13 and/or characteristic 14 have/has essentially the same distribution for synthetic radar signals 12 as for measured radar signals 10.

A plurality of two- or multi-dimensional frequency representations 13 generated by generator 1 are combined in a data set 13a. This data set 13a makes it possible, for example, for the database for the monitored learning of an object detection to be enlarged on the basis of radar signals.

Figure 2:
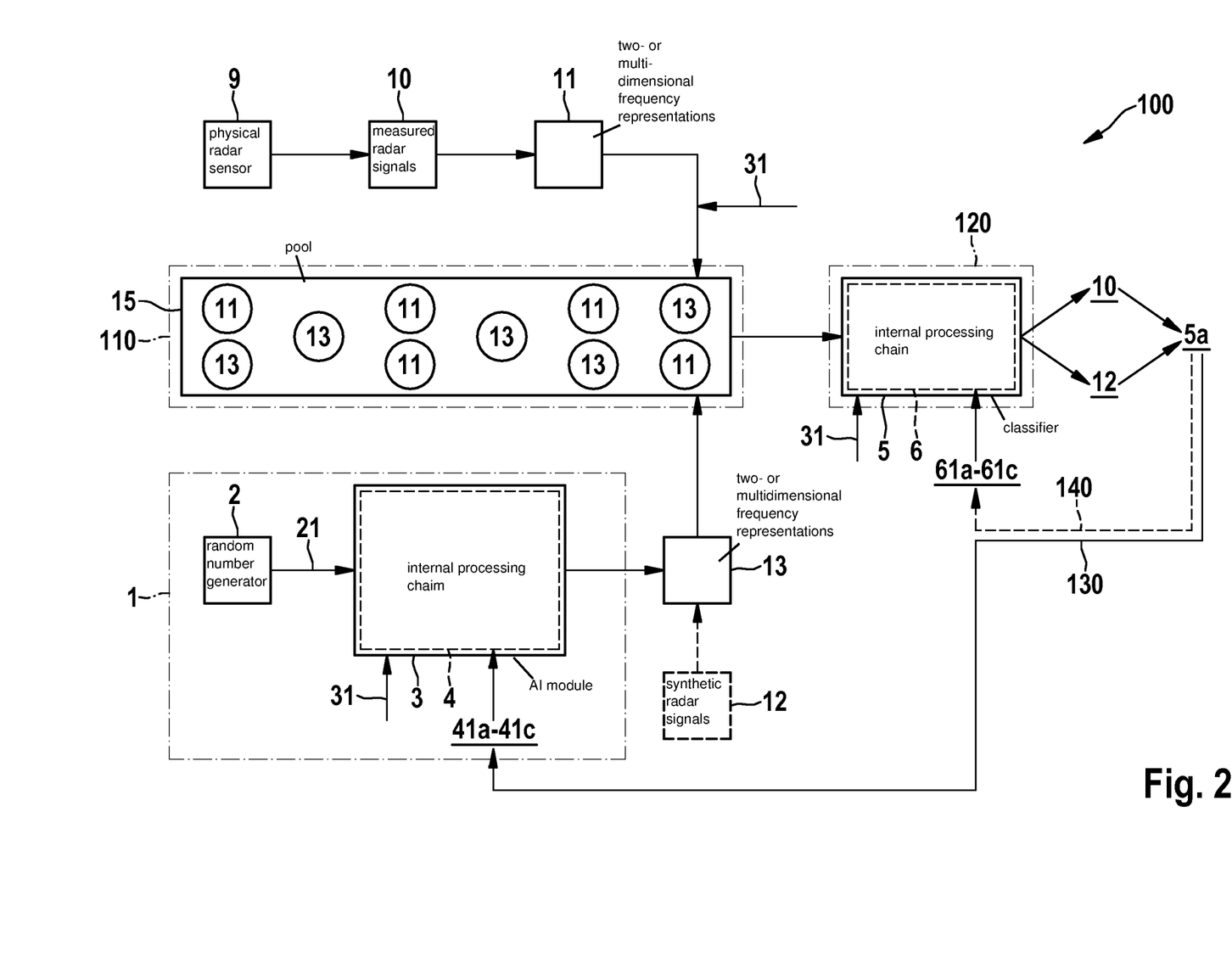
FIG. 2 shows an exemplary embodiment of method 100 for manufacturing in accordance with the present invention.

FIG. 2 shows an exemplary embodiment of method 100 for manufacturing generator 1. The primary objective of this method 100 is to obtain parameters 41a-41c for internal processing chain 4 of AI module 3 in generator 1.

Analogously to FIG. 1, two- or multi-dimensional frequency representations 13 of synthetic radar signals 12 are generated by generator 1, taking into account boundary condition 31. In a pool 15, these are merged in step 110 of method 100, together with two- or multi-dimensional frequency representations 11 of physically measured radar signals 10, which match same boundary condition 31.

In step 120 of method 100, a classifier 5 classifies two- or multi-dimensional frequency representations 11, 13 contained in pool 15 as to whether they belong to measured radar signals 10 or synthetic radar signals 12. For this classification, it is possible to specify a classification quality 5a which, for example, may include the accuracy and/or the confidence of the classification.

In step 130 of method 100, parameters 41a-41c of internal processing chain 4 in AI module 3 of generator 1 are optimized at this stage to a worst possible classification quality 5a of classifier 5.

Classifier 5 may be a static classifier which does not learn any further. In the exemplary embodiment shown in FIG. 2, classifier 5 is in the form of a second AI module, however, and has another internal processing chain 6 which is parameterized by a multiplicity of parameters 61a-61c. In step 140 of method 100, these parameters 61a-61c are optimized to a best possible classification quality 5a of classifier 5.

Steps 130 and 140 may be implemented simultaneously or, however, also alternately, for example.

Figure 3:
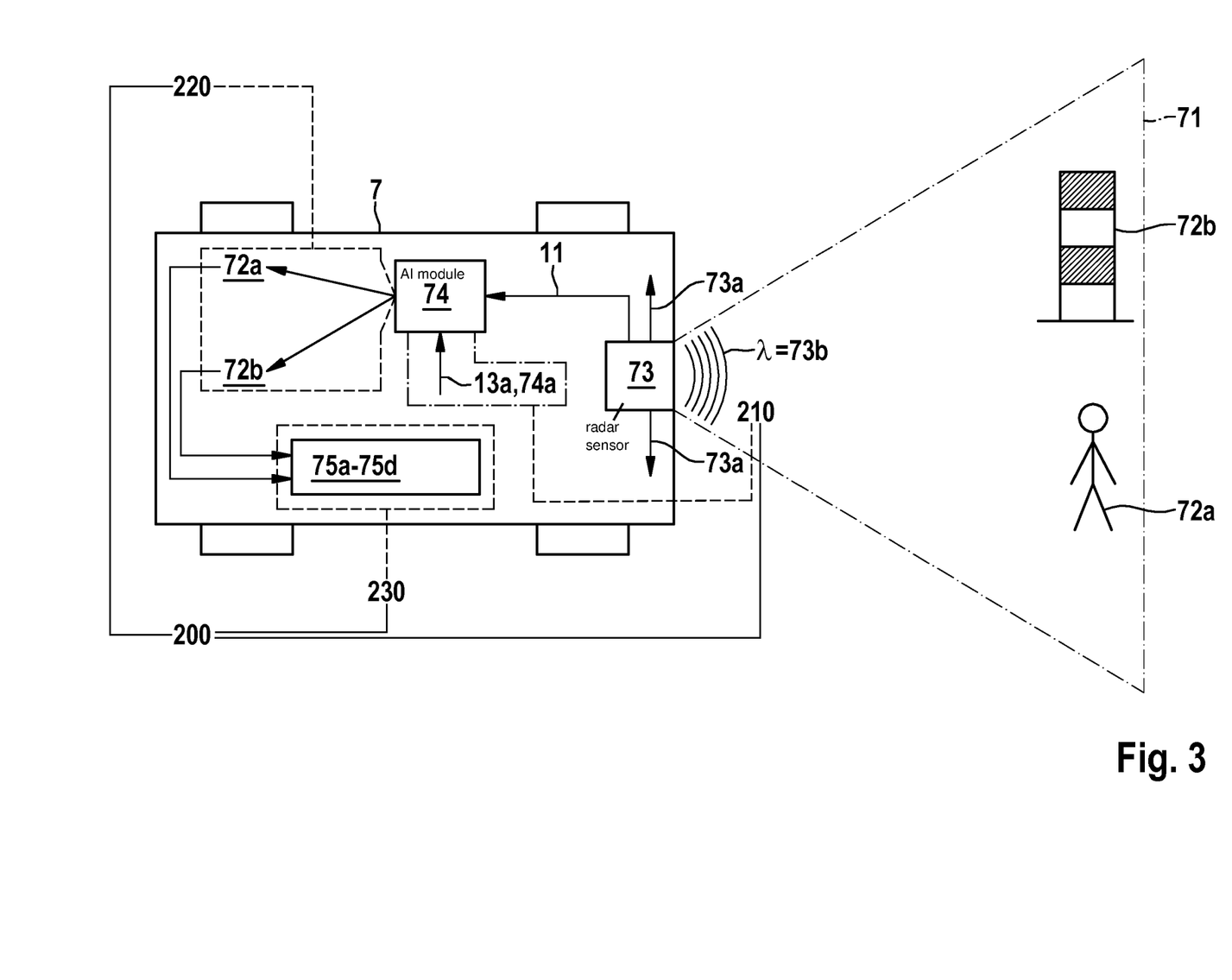
FIG. 3 shows an exemplary embodiment of method 200 for object detection in accordance with the present invention.

FIG. 3 shows an exemplary embodiment of method 200 for detecting objects 72a, 72b, and/or a space, which is free of objects 72a, 72b of a specific type, in driving environment 71 of a vehicle 7. A radar sensor 73, which delivers two- or multi-dimensional frequency representations 11 of the measured radar signals to a third AI module 74, is used as the data source for the detection. This AI module 74 was trained using training data 74a which include a data set 13a generated by a generator 1. In addition to data set 13a, training data 74a may, in particular also include physical measurements, so that, ultimately, data set 13a supplements the physical measurements. It is also possible that AI module 74 is first trained correspondingly in step 210 of method 200.

In step 220 of method 200, AI module 74 classifies two- or multi-dimensional frequency representations 11 according to which objects 72a, 72b are present in sensed driving environment 71 of vehicle 7. A pedestrian 72a and a concrete bollard 72b are marked as exemplary objects in FIG. 3.

The result of the classification is used in step 230 of method 200 to trigger a warning device 75a for the driver of vehicle 7, a drive system 75b, a steering system 75c and/or a braking system 75d of vehicle 7 to avoid a collision with detected objects 72a, 72b and/or to adapt the speed and/or trajectory of vehicle 7. For example, the speed may be controlled to a setpoint, and/or a driver assistance system may select a lane. Besides the radar signals, additional information from other sensors, such as cameras, lidar or ultrasonic sensors, may be used as well for these tasks.

The physical acquisition of data by radar sensor 73 is influenced, inter alia, by installation parameters 73a, here, for example, by the installation position of radar sensor 73a, and by operating parameters 73b, here, for example, wavelength A of the transmitted radar waves. For that reason, installation parameters 73a and operating parameters 73b constitute further degrees of freedom which may be optimized to improve the final result of the object detection or other applications, such as lateral guidance, for example.

Figure 4:
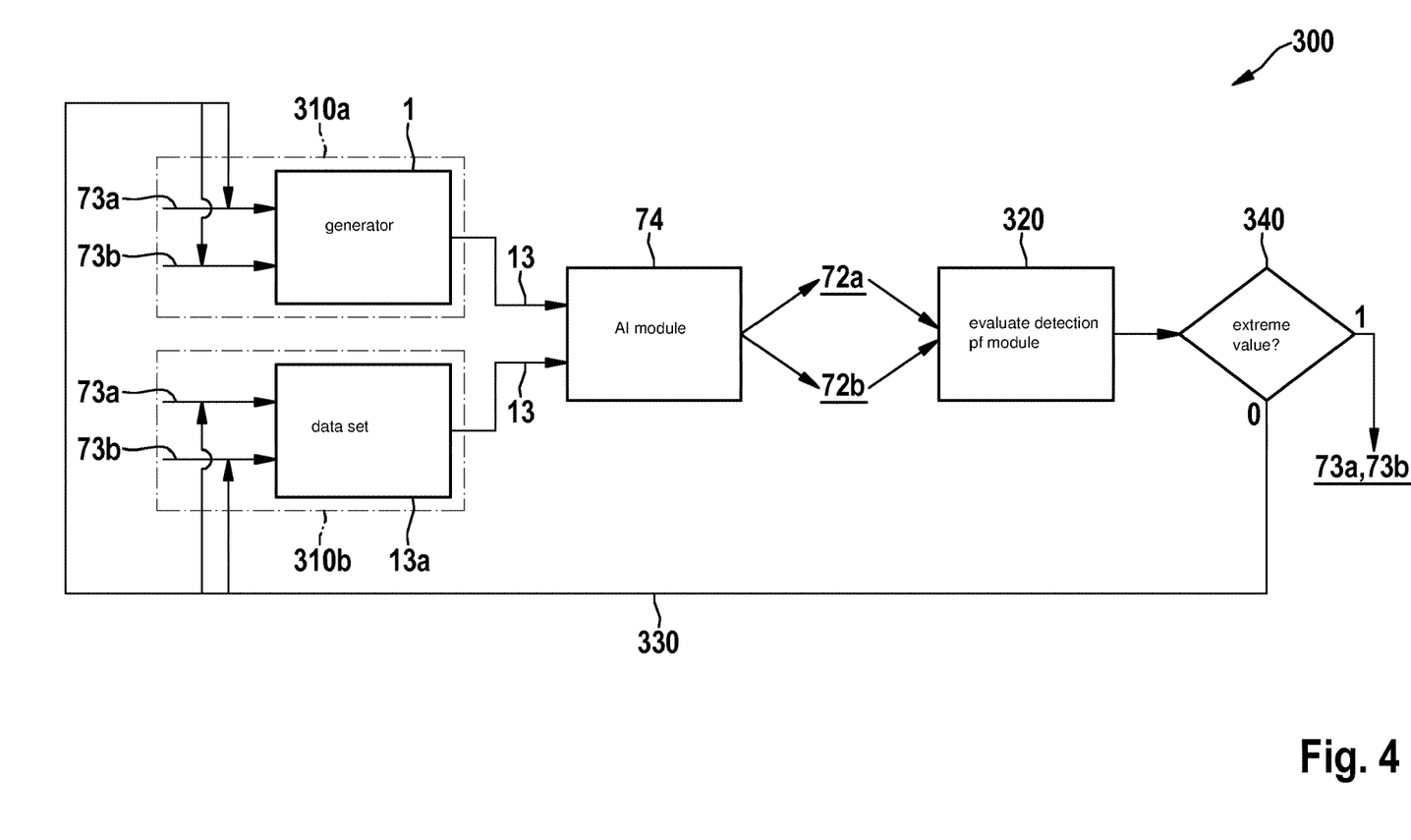
FIG. 4 shows an exemplary embodiment of method 300 for optimization in accordance with the present invention.

An exemplary embodiment of method 300 for this optimization is sketched in FIG. 4. On the basis of a value of installation parameter 73a and/or of operating parameter 73b, a two- or multi-dimensional frequency representation 13 of a synthetic radar signal 12 is generated by generator 1 in step 310a of method 300, and/or such a two- or multi-dimensional frequency representation 13 is retrieved from a data set 13a previously generated by a generator 1 in step 310b of method 300.

Third AI module 74, which is also to be actually used in vehicle 7, classifies two- or multi-dimensional frequency representation 13 as to which objects 72a, 72b are detectable herein. A measure of quality is used in step 320 of method 300 to evaluate this detection of objects 72a, 72b. Step 340 of method 300 checks whether this measure of quality assumes an extreme value, as desired. If this is the case (truth value 1), the tested value of installation parameter 73a, respectively of operating parameter 73b is then found to be optimal. On the other hand, if the desired extreme value is not assumed (truth value 0), installation parameter 73a, respectively operating parameter 73b is varied in step 330 of method 300 to more closely approach the desired extreme value, respectively to reach the same at the next pass.

What is claimed is:

1. A generator for generating two- or multi-dimensional frequency representations of synthetic radar signals from a set of radar signals measured by a physical radar sensor, comprising:

a random number generator; and a first artificial intelligence (AI) module, which, as input, receives vectors of random values or tensors of the random values from the random number generator, and is configured to use an internal processing chain to map each of the vectors or tensors, onto a two- or multi-dimensional frequency representation of a synthetic radar signal, the internal processing chain of the first AI module being parameterized by a multiplicity of parameters, and the parameters are set in such a way that the two- or multi-dimensional frequency representation of the radar signal and/or at least one characteristic derived from the two- or multi-dimensional frequency representation has the same distribution for the synthetic radar signals as for the measured radar signals.

2. The generator as recited in claim 1, wherein the at least one characteristic includes reflex points to which a distance, or an azimuth angle, or a velocity, or a backscatter coefficient or an elevation angle are assigned relative to the physical radar sensor.

3. The generator as recited in claim 1, wherein the first AI module receives, as input, at least one boundary condition, and the parameters of the internal processing chain are set in such a way that the two- or multi-dimensional frequency representation and/or the characteristic have the same distribution for the synthetic radar signals as for those measured radar signals which satisfy the boundary condition.

4. The generator as recited in claim 1, where the first AI module includes an artificial neural network whose internal processing chain has at least one convolutional layer and/or at least one fully networked layer.

5. Synthetic radar signals, generated by using a generator, the generator including a random number generator, and a first artificial intelligence (AI) module, which, as input, receives vectors of random values or tensors of the random values from the random number generator, and is configured to use an internal processing chain to map each of the vectors or tensors, onto a two- or multi-dimensional frequency representation of a synthetic radar signal, the internal processing chain of the first AI module being parameterized by a multiplicity of parameters, and the parameters are set in such a way that the two- or multi-dimensional frequency representation of the radar signal and/or at least one characteristic derived from the two- or multi- dimensional frequency representation has the same distribution for the synthetic radar signals as for measured radar signals.

6. A data set comprising a plurality of the two- or multi-dimensional frequency representations of synthetic radar signals, each of the synthetic radar signals generated by using a generator, the generator including a random number generator, and a first artificial intelligence (AI) module, which, as input, receives vectors of random values or tensors of the random values from the random number generator, and is configured to use an internal processing chain to map each of the vectors or tensors, onto a two- or multi-dimensional frequency representation of the synthetic radar signal, the internal processing chain of the first AI module being parameterized by a multiplicity of parameters, and the parameters are set in such a way that the two- or multi-dimensional frequency representation of the radar signal and/or at least one characteristic derived from the two- or multi-dimensional frequency representation has the same distribution for the synthetic radar signals as for measured radar signals.

7. A method for manufacturing a generator, the generator including a random number generator, and a first artificial intelligence (AI) module, which, as input, receives vectors of random values or tensors of the random values from the random number generator, and is configured to use an internal processing chain to map each of the vectors or tensors, onto a two- or multi-dimensional frequency representation of the synthetic radar signal, the internal processing chain of the first AI module being parameterized by a multiplicity of parameters, and the parameters are set in such a way that the two- or multi-dimensional frequency representation of the radar signal and/or at least one characteristic derived from the two- or multi-dimensional frequency representation has the same distribution for the synthetic radar signals as for measured radar signals, the method comprising:

combining, in a pool, two- or multi-dimensional frequency representations of the measured radar signals with two- or multi-dimensional frequency representations of the synthetic radar signals generated by the generator;

classifying each of the two- or multi-dimensional frequency representations contained in the pool, by a classifier, as to whether it belongs to measured radar signals or synthetic radar signals; and optimizing the parameters of the processing chain of the first AI module in the generator to a worst possible classification quality of the classifier.

8. The method as recited in claim 7, wherein the classifier is a second AI module, the second AI module having a further internal processing chain which is parameterized by a multiplicity of parameters, the parameters of the second AI module being optimized to a most effective possible classification quality of the classifier.

9. A method for optimizing at least one installation parameter or operating parameter for a radar sensor for detecting objects and/or a space which is free of objects of a specific type, in a driving environment of a vehicle, the method comprising:

(i) generating, by a generator, for different values of the installation parameter or operating parameter, at least a two- or multi-dimensional frequency representation of a synthetic radar signal, the generator including a random number generator, and a first artificial intelligence (AI) module, which, as input, receives vectors of random values or tensors of the random values from the random number generator, and is configured to use an internal processing chain to map each of the vectors or tensors, onto a two- or multi-dimensional frequency representation of the synthetic radar signal, the internal processing chain of the first AI module being parameterized by a multiplicity of parameters, and the parameters are set in such a way that the two- or multi-dimensional frequency representation of the radar signal and/or at least one characteristic derived from the two- or multi-dimensional frequency representation has the same distribution for the synthetic radar signals as for measured radar signals, and/or (ii) retrieving from a data set, for the different values of the installation parameter or operating parameter, the two- or multi-dimensional frequency representation of the synthetic radar signal generated by the generator;

using a measure of quality to evaluate detection of objects in the two- or multi-dimensional frequency representation of the synthetic radar signal; and varying the installation parameter or operating parameter in such a way that the measure of quality assumes an extreme value.

10. A method for generating two- or multi-dimensional frequency representations of synthetic radar signals from a set of radar signals measured using a physical radar sensor using a generator, the method comprising:

receiving, as input, by a first artificial intelligence (AI) module of the generator, vectors of random values or tensors of the random values from a random number generator of the generator; and mapping each of the vectors or tensors onto a two- or multi-dimensional frequency representation of a synthetic radar signal using an internal processing chain of the first AI module, the internal processing chain of the first AI module being parameterized by a multiplicity of parameters, and the parameters being set in such a way that the two- or multi-dimensional frequency representation of the radar signal and/or at least one characteristic derived from the frequency representation, has the same distribution for the synthetic radar signals as for the measured radar signals.

11. The method as recited in claim 10, further comprising:

receiving as input, by the first AI module, at least one boundary condition, wherein the parameters of the internal processing chain are set in such a way that the two- or multi-dimensional frequency representation and/or the characteristic has the same distribution for the synthetic radar signals as for those measured radar signals which satisfy the boundary condition.

12. A control unit configured to optimize at least one installation parameter or operating parameter for a radar sensor for detecting objects and/or a space which is free of objects of a specific type, in a driving environment of a vehicle, the control unit configured to:

(i) generate, using a generator, for different values of the installation parameter or operating parameter, at least a two- or multi-dimensional frequency representation of a synthetic radar signal, the generator including a random number generator, and a first artificial intelligence (AI) module, which, as input, receives vectors of random values or tensors of the random values from the random number generator, and is configured to use an internal processing chain to map each of the vectors or tensors, onto a two- or multi-dimensional frequency representation of the synthetic radar signal, the internal processing chain of the first AI module being parameterized by a multiplicity of parameters, and the parameters are set in such a way that the two- or multi-dimensional frequency representation of the radar signal and/or at least one characteristic derived from the two- or multi-dimensional frequency representation has the same distribution for the synthetic radar signals as for measured radar signals, and/or (ii) retrieve from a data set, for the different values of the installation parameter or operating parameter, the two- or multi-dimensional frequency representation of the synthetic radar signal generated by the generator;

use a measure of quality to evaluate detection of objects in the two- or multi-dimensional frequency representation of the synthetic radar signal; and vary the installation parameter or operating parameter in such a way that the measure of quality assumes an extreme value.

13. A non-transitory machine-readable memory element on which is stored a computer program for optimizing at least one installation parameter or operating parameter for a radar sensor for detecting objects and/or a space which is free of objects of a specific type, in a driving environment of a vehicle, the computer program, when executed by a computer, causing the computer to perform:

(i) generating, by a generator, for different values of the installation parameter or operating parameter, at least a two- or multi-dimensional frequency representation of a synthetic radar signal, the generator including a random number generator, and a first artificial intelligence (AI) module, which, as input, receives vectors of random values or tensors of the random values from the random number generator, and is configured to use an internal processing chain to map each of the vectors or tensors, onto a two- or multi-dimensional frequency representation of the synthetic radar signal, the internal processing chain of the first AI module being parameterized by a multiplicity of parameters, and the parameters are set in such a way that the two- or multi-dimensional frequency representation of the radar signal and/or at least one characteristic derived from the two- or multi-dimensional frequency representation has the same distribution for the synthetic radar signals as for measured radar signals, and/or (ii) retrieving from a data set, for the different values of the installation parameter or operating parameter, the two- or multi-dimensional frequency representation of the synthetic radar signal generated by the generator;

using a measure of quality to evaluate detection of objects in the two- or multi-dimensional frequency representation of the synthetic radar signal; and varying the installation parameter or operating parameter in such a way that the measure of quality assumes an extreme value.

* * * * *